United States Patent [19]

Hane et al.

[11] Patent Number: 5,272,815
[45] Date of Patent: Dec. 28, 1993

[54] GYRO COMPASS

[75] Inventors: Fuyuki Hane; Shinichi Kawada; Takeshi Hojo; Mamoru Akimoto; Kazushige Murabayashi, all of Tokyo, Japan

[73] Assignee: Tokimec Inc., Tokyo, Japan

[21] Appl. No.: 790,245

[22] Filed: Nov. 8, 1991

[30] Foreign Application Priority Data

Nov. 14, 1990 [JP] Japan .................. 3-307866
Nov. 14, 1990 [JP] Japan .................. 3-307867

[51] Int. Cl.$^5$ ............................. G01C 19/38
[52] U.S. Cl. ........................ 33/326; 33/324
[58] Field of Search ............ 33/326, 327, 324, 316, 33/317 D; 74/5.47, 5.9

[56] References Cited

U.S. PATENT DOCUMENTS

| | | | |
|---|---|---|---|
| 2,157,360 | 5/1939 | Thompson | 33/326 |
| 2,302,894 | 11/1942 | Ross | 33/326 |
| 3,254,419 | 6/1966 | Hurlburt | 33/326 |
| 3,279,086 | 10/1966 | Schlitt et al. | 33/324 |
| 3,555,692 | 1/1971 | Aberle et al. | 33/326 |
| 3,577,646 | 5/1971 | Eklund | 33/324 |
| 3,935,644 | 2/1976 | Kawada et al. | 33/324 |
| 3,938,256 | 2/1976 | Crocker, Jr. | 33/324 |
| 4,458,426 | 7/1984 | O'Connor et al. | 33/326 |
| 4,622,646 | 11/1986 | Waller et al. | 33/326 |
| 4,879,918 | 11/1989 | Hojo et al. | 33/327 |

FOREIGN PATENT DOCUMENTS

| | | | |
|---|---|---|---|
| 2523466 | 4/1976 | Fed. Rep. of Germany | 33/326 |
| 0061908 | 4/1982 | Japan | 33/324 |
| 0088310 | 4/1989 | Japan | 33/324 |
| 2103364 | 2/1983 | United Kingdom | 33/324 |

Primary Examiner—Thomas B. Will
Attorney, Agent, or Firm—Bauer & Schaffer

[57] ABSTRACT

A gyro compass having a gyro case housing therein a gyro and supported with freedom of three axes, functions for outputting a signal corresponding to an inclined angle of the gyro spin axis relative to the horizontal plane and a function for applying a torque around a vertical axis of the gyro case in proportion to an input signal, and a controller supplied with the signal corresponding to the inclined angle and a latitude value at which the gyro compass is located, wherein a constant relative to the input latitude value is set by the controller after the gyro compass is energized, a signal, which results from differentiating the signal corresponding to the inclined angle during a predetermined time, is added to a signal, which results from multiplying the signal corresponding to the inclined angle with the constant and an added result is set as the input signal, whereby a constant optimum north-seeking movement is carried out regardless of the change of the latitude value to thereby reduce a settle time. Also, the gyro compass having an error corrector supplied with the signal corresponding to the inclined angle, a speed signal of a navigation vehicle and its heading azimuth signal, wherein a bias error caused by the inclined angle of the gyro compass spin axis and an azimuth error caused by the movement of the navigation vehicle are estimated and calculated to thereby reduce an azimuth error caused by the bias error.

1 Claim, 10 Drawing Sheets

GYRO COMPASS

BACKGROUND OF THE INVENTION

1. Field of the Invention

The present invention generally relates to marine gyro compasses and, more particularly, is directed to a fast settle apparatus and an error correcting apparatus thereof.

2. Description of the Prior Art

Referring to the drawings in detail, and initially to FIG. 1, let us describe a gyro compass described in Japanese Patent No. 428317 as an example of a conventional gyro compass to which a fast settle apparatus of the present invention can be applied.

The entirety of the gyro compass is depicted by reference symbol A in FIG. 1, and the gyro compass A includes a gyro case 1. As shown in FIG. 1, the gyro case 1 houses therein a gyro rotor (not shown) which is rotated at high speed and at a constant revolution rate by an induction motor (not shown), and a rotary vector of the gyro rotor is directed to the south (i.e., directed in the clockwise direction as viewing from the north). The gyro case 1 has a pair of vertical shafts 2, 2' protruded from the upper and lower portions thereof, and these protruded vertical shafts 2, 2' are respectively fitted into inner rings of ball bearings 4, 4' mounted to corresponding positions of a vertical ring 3 provided outside of the gyro case 1. A suspension wire 5 is secured at its lower end to the upper vertical shaft 2 and the upper end thereof is attached to the vertical ring 3 by means of a suspension wire mount 5'.

According to the above-mentioned arrangement, the weight of the gyro case 1 is not applied to the ball bearings 4, 4' of the vertical shafts 2, 2' as a thrust load but is fully received by the suspension wire 5, thereby friction torque of the abovementioned ball bearings 4, 4' being reduced considerably. A pair of liquid ballistics 6 are mounted on the east and west of the vertical ring 3 in order to apply a north-seeking torque to the gyro.

As shown in FIG. 2, each of the liquid ballistics 6 is a kind of a communicated tube and is composed of reservoirs 6-1, 6-1' disposed in the north and south of the gyro, liquid 6-2 of high specific gravity substantially filled into these reservoirs 6-1, 6-1' substantially up to the halves thereof, an air tube 6-3 communicating the north and south reservoirs 6-1, 6-1' above and a liquid tube 6-4 communicating the north and south reservoirs 6-1, 6-1' below.

Referring to FIG. 1, it will be seen that a damping weight 7 is mounted on the west side of the gyro case 1 in order to damp the north-seeking movement. As shown in FIG. 1, a primary coil 8-1 of a differential transformer for detecting a declination between the gyro case 1 and the vertical shafts 2, 2' of the vertical ring 3 is attached to the east side of the gyro case 1, and a secondary coil 8-2 of the differential transformer is attached to the opposed position of the vertical ring 3, thereby constituting a follow-up pickup 8. The vertical ring 3 includes a pair of horizontal shafts 9, 9' protruded outwardly from the east and west positions perpendicular to both of the vertical shafts 2, 2' and a gyro spin axis. These horizontal shafts 9, 9' are respectively fitted into inner rings of ball bearings 11, 11' attached to the corresponding positions of a horizontal ring 10 provided outside of the vertical ring 3. The horizontal ring 10 has a pair of gimbal shafts 12, 12' disposed at its positions within the horizontal plane and which are perpendicular to the horizontal shafts 9, 9'. These gimbal shafts 12, 12' are respectively fitted into a pair of gimbal shaft ball bearings 14, 14' attached to a follow-up ring 13 disposed outside of the horizontal ring 10.

As shown in FIG. 1, the follow-up ring 13 has upper and lower follow-up shafts 15, 15' and these follow-up shafts 15, 15' are respectively fitted into follow-up shaft ball bearings 17, 17' disposed at the opposing positions of a binnacle 16.

The upper follow-up shaft 15 has a compass card 18 attached at its shaft end and an azimuthal angle in the bow is read by the cooperation of the compass card 18 and a lubber line 18B secured to the binnacle 16 at the corresponding position in the bow side. An azimuth servo motor 19 is attached to the lower portion of the binnacle 16, the rotary shaft 19A of which is coupled through an azimuth pinion 20 to an azimuth gear 21 located at the lower portion of the follow-up ring 13. An azimuth transmitter 22 is attached to the lower portion of the binnacle 16 and its rotary shaft 22A is meshed with the azimuth gear 21 via a gear system (not shown), whereby an azimuth signal is converted into an electrical signal by the azimuth transmitter 22, which is transmitted to the outside.

The part within the horizontal ring 10, that is, the part including the horizontal ring 10, the vertical ring 3, the gyro case 1 or the like is normally called a gyro sensitive unit. The gyro sensitive unit constructs a vertical physical pendulum around the gimbal shafts 12, 12', whereby the horizontal shafts 9, 9' are constantly kept within the horizontal plane regardless of ship's inclination.

If there is a difference between the azimuth of the gyro case 1 and the azimuth of the vertical ring 3, then such difference is detected and converted into an electrical signal by the follow-up pickup 8 provided between the gyro case 1 and the vertical ring 3. The resultant electrical signal is amplified by an external servo amplifier 23 and supplied to the azimuth servo motor 19 (which forms an azimuth servo system). The rotation of the azimuth servo motor 19 is transmitted through the rotary shaft 19A, the gear train (not shown) and the azimuth gear 21 to the follow-up ring 13 and is further transmitted through the horizontal ring 10, the horizontal shafts 9, 9' or the like to the vertical ring 3, thereby constantly holding the azimuthal error between the vertical ring 3 and the gyro case 1 at zero.

Owing to the action of the azimuth servo system, the horizontal shafts 9, 9' and the gyro spin axis are constantly kept in an orthogonal relation and the gyro can be prevented from being applied with twisting torque. That is, owing to the actions of the three shafts such as the vertical shafts 2, 2', the horizontal shafts 9, 9' and the gimbal shafts 12, 12, having the servo system, the gyro case 1 is completely isolated from the angular motion of the ship, thereby the gyroscope being constructed.

The above-mentioned liquid ballistics 6 are adapted to give the gyroscope the north-seeking force, i.e., function as the compass.

The principle of the liquid ballistic 6 will be described with reference to FIG. 2. FIG. 2 shows the case such that the north-seeking end of the gyro is inclined from the horizontal plane by an angle $\theta$. In this case, assuming that the ship is in its stopped condition, then the liquid surface of the liquid 6-2 becomes perpendicular to the direction of gravity force g. Therefore, as compared with the case such that the inclination of the north-seeking end relative to the horizontal plane is zero, the liquid at the hatched portion of FIG. 2 is decreased in the north-side reservoir 6-1' and is increased in the south-side reservoir 6-1. Assuming now that $r_1$ is a distance from the horizontal shafts 9, 9' to the center of the two reservoirs 6-1, 6-1', S is a cross section area of the two reservoirs 6-1, 6-1' and $\rho$ is a specific gravity of the liquid 6-2, then the weight of the liquid at the inclined portion is expressed as:

$$S \times r_1 \cdot \sin \times \rho \times g$$

Since the above-mentioned weight unbalance occurs in the two south and north reservoirs 6-1, 6-1' and the moment arm from the horizontal shafts 9, 9' is $r_1$, a torque $T_H$ produced about the horizontal shafts 9, 9' by the liquid ballistics 6 when the north-seeking end of the gyro is inclined from the horizontal plane by $\theta$ is approximately calculated as:

$$T_H = 2 S r_1^2 g \rho \theta$$

$$2 S r_1^2 g \rho = K$$

where K is the ballistic constant. That is, the liquid ballistics 6 act to apply the torque proportional to the inclination relative to the horizontal plane of the gyro spin axis to the surrounding of the horizontal shafts 9, 9, of the gyro, thereby rendering the north-seeking force to the gyro. Thus, the gyro is rendered the gyro compass.

As described above, we have considered so far the case that the ship is in the still condition. In this case, assuming that $a_N$ is a south-north component of ship's acceleration due to increase and decrease of ship's speed, ship's turning or the like, a torque $T_{H1}$ generated from the liquid ballistic 6 under the ship's sailing condition is expressed by the following equation:

$$T_{H1} = K \cdot \left( \theta + \frac{a_N}{g} \right)$$

As shown in FIG. 3, the damping weight 7 is attached to the gyro case 1 with a distance $r_2$ (in the direction perpendicular to the sheet of drawing) from the vertical shafts 2, 2' within the plane including the vertical shafts 2, 2' and perpendicular to the gyro spin axis. FIG. 3 shows the gyro case 1 under the condition such that the north-seeking side of the gyro is inclined upward from the horizontal plane by the angle $\theta$ as viewing from the west. As shown in FIG. 3, a gravitational acceleration g acts on the damping weight 7 of mass m so that a force of m$\times$g acts on the damping weight 7 in the vertical direction. In this case, let us consider that this force is divided into a component m g cos $\theta$ parallel to the vertical shafts 2, 2' and a component m g sin $\theta$ the vertical shafts 2, 2' acts only as a load on the vertical shaft ball bearings 4, 4', while the component m g sin $\theta$ parallel to the spin axis acts on the gyro as a torque multiplied with a distance $r_2$ from the vertical shafts 2, 2' around the vertical shafts 2, 2'. Assuming that T$\phi$ represents the above torque, then the torque T$\phi$ is approximately given by the following equation:

$$T\phi = \mu \cdot \theta$$

where $\mu = $ m g $r_2$.

That is, the damping weight 7 can be regarded as the apparatus which applies the vertical axes 2, 2' of the gyro with the torque proportional to the inclination of the gyro spin axis relative to the horizontal plane, and the north-seeking motion of the compass can be damped by the damping weight 7.

Further, a torque $T\phi 1$ generated during the ship's sailing is expressed by the following equation, considering the acceleration caused by ship's motion:

$$T\phi 1 = \mu \cdot \left( \theta + \frac{a_N}{g} \right)$$

FIG. 4 shows in block form a principle of the conventional gyro compass of FIG. 1, that is, the north-seeking motion of the conventional gyro compass in which an azimuthal error $\phi$ and an inclined angle $\theta$ from the due north of the north-seeking end of the gyro spin axis are assumed to be variables and which copes with their initial errors $\theta_o$, $\theta_o$ are expressed by Laplace operator and transfer function in a block form. In FIG. 4, $\omega$ represents earth rotation angular velocity, H angular momentum of gyro, $\lambda$ latitude of that spot, K north-seeking constant (ballistic constant), $\mu$ damping constant and S Laplace operator.

If now there is the azimuthal error $\phi$, then a component in which the azimuthal error $\phi$ is multiplied with a horizontal component $\omega \cos \lambda 100$ of the earth rotation velocity $\omega$ acts on an element 101 around the horizontal axis of the gyro as an angular velocity input, thereby generating the gyro angle $\theta$ together with an initial inclined angle $\theta_o$. The vertical ring 3 is similarly inclined by the inclination angle $\theta$ of the gyro spin axis, and the liquid ballistic 6 attached to the vertical ring 3 is also inclined, thereby the liquid 6-2 within the liquid ballistic 6 being moved in the lower reservoir, thereby a torque K$\theta$ being generated around the horizontal shaft of the gyro. This torque K$\theta$ is divided by the angular momentum H of the gyro and is then added with a vertical component $\omega \sin \lambda$ of the earth rotation angular velocity, thereby being generated as an angular velocity input. This angular velocity input acts on a vertical shaft element 102 of the gyro, and this angular velocity input is added with the initial azimuth error $\theta_o$ to produce the azimuth error $\phi$, thereby closing the loop. This loop is what might be called a north-seeking loop of the gyro compass. Since two poles expressed by 1/S exist within this loop, this loop becomes an oscillating solution. On the other hand, a torque $\mu\theta$ is obtained by multiplying the gyro inclined angle $\theta$ with the damping constant $\mu$ and this torque $\mu\theta$ is divided by the angular momentum H so as to provide an angular velocity input. This angular velocity input is negatively fed back to the horizontal element 101 of the gyro so as to decrease the above inclined angle $\theta$, thereby the north-seeking motion of the north-seeking loop being damped. This latter loop is a damping loop.

In order to prevent an acceleration error from being caused in the gyro compass due to horizontal accelerations, such as increase and decrease of speed, turning or the like of the ship, the marine gyro compass is generally designed such that the north-seeking motion cycle is selected to be about 90 minutes (Schuler's condition). For this reason, it takes plenty of time for the gyro compass to be settled to the true north so as to be operable since the gyro compass has been energized. This time is what might be called a settle time.

In the ordinary ships, the above settle time does not raise a problem in their navigation substantially, however, this long settle time raises a problem in the ships for some special use.

Accordingly, Japanese Laid-Open Patent Publication No. 1-113611 describes a gyro compass having a fast settle apparatus which can reduce its settle time.

This conventional fast settle apparatus will now be described. In such a gyro compass which is comprised of a gyro case housing therein a gyro whose spin axis is kept substantially horizontal, a supporting apparatus for supporting the gyro case with three-axis freedom and having a function for outputting an inclined angle of the spin axis of the gyro relative to the horizontal plane and a function for applying a torque to the vertical axis of the gyro case in proportion to the input signal, the fast settle apparatus includes a control apparatus which is supplied with a signal corresponding to the inclined angle. In this control apparatus, the signal corresponding to the inclined angle is differentiated during a predetermined time since the gyro compass has been energized and a resultant differentiated signal is used as the above-mentioned input signal, thereby the settle time being reduced.

In the gyro compass having the above fast settle apparatus, if the latitude at which the gyro compass is located is changed, e.g., at a high latitude if the gyro compass is settled by operating the fast settle apparatus, then the above-mentioned north-seeking motion is placed in the so-called over-damping state due to the action of the torque generated around the vertical axis of the gyro by the damping constant $\mu$ of the damping loop. As a consequence, the settle time is increased so that, even if the gyro compass is provided with the fast settle apparatus the settle time cannot be reduced in the high latitude as expected.

Further, in FIG. 5 which shows a schematic block diagram of the gyro compass according to the prior art, g represents the gravitational acceleration, R the earth radius, $\omega$ the rotation angular velocity of earth, H the angular momentum of gyro, $\lambda$ the latitude at that spot, $\tau_G$ the time constant provided when the movement of the liquid surface of the ballistic 6 is approximated by the primary delay, K the north-seeking constant, $\mu$ the damping constant, $a_N$ the acceleration acting on the north-south direction of the gyro case due to the ship's movement, $V_{NS}$ the north-south velocity of the ship and S the Laplace operator.

A sum of the gyro inclined angle $\theta$ and a value $a_N/g$, which results from dividing the north-south acceleration $a_N$ by the gravitational acceleration g, acts on the primary delay transfer element 50 (time constant $\tau_{10}$) provided by the liquid 6-2 of the ballistic 6 to form the liquid surface inclination $\xi$.

A precessional angular velocity $$\xi \times \frac{K}{H}$$

provided by multiplying $\xi$ with a value K/H (51), which results from dividing the north-seeking constant K by the angular momentum H of the gyro and which is generated around the vertical axis acts around the vertical axis of the gyro case 52 together with the vertical component $\omega \sin \lambda$ of the earth rotation angular velocity $\omega$ to produce the azimuthal movement around the vertical axis. Then, the azimuth error $\phi$ is generated.

A value, which results from multiplying the azimuthal error $\phi$ with the horizontal component $\omega \cos \lambda$ 53 of the earth rotation angular velocity $\omega$, is input to a gyro element 54 around the horizontal axis of the gyro as the angular velocity input to thereby generate the gyro inclined angle $\theta$.

The above-mentioned portion is what might be called a north-seeking loop of the gyro compass, in which two poles expressed by 1/S exist within the loop, thereby generating the oscillation solution.

An angular velocity $$\mu \times \left(\theta + \frac{a_N}{g}\right)/H,$$

which results from dividing by the gyro angular momentum H the torque $$\mu \times \left(\theta + \frac{a_N}{g}\right)$$

around the vertical axis in which $$\theta + \frac{a_N}{g},$$

which results adding the gyro inclined angle $\theta$ with $$\frac{a_N}{g},$$

is multiplied with the damping constant $\mu$ is input to a gyro element 54 around the horizontal axis together with the equivalent angular velocity $V_{NS}/R$ which results from dividing the north-south speed $V_{NS}$ of ship by the earth radius R, whereby the gyro inclined angle $\theta$ is reduced and the north-seeking movement is damped. Therefore, this loop is called a damping loop.

For the north-seeking loop, the north-south velocity $V_{NS}$ generates an azimuth error $\phi_V$ proportional to second of the latitude expressed by the following equation.

$$\phi_v = \frac{V_N}{R \Omega \cos \lambda} = \frac{V \cos C}{R \Omega \cos \lambda}$$

where C is the azimuth angle of the ship's heading.

FIG. 6 is a graph illustrating the movement of the gyro when the ship turns by 180° at time $t_1$ from the condition that the ship sails straight ahead on the course 0° for a long time and the gyro compass is settled with velocity error $\phi_{V1}$ at that time and then the ship sails straight ahead on the course 180° from time $t_2$. This fundamental influence of the gyro compass exerted by the acceleration can be reduced to the ordinary gyro compass.

An azimuth change $\phi_B$ generated by the acceleration between the time $t_1$ and the time $t_2$ is called as ballistic amount. A design method for making the azimuth change $\phi_B$ equal to the difference between the velocity errors before and after the acceleration acts is the important condition called the Schuler tuning in the gyro compass and corrects the influence of the acceleration in the form of velocity error (the north-seeking cycle of the gyro compass is extended to 1 to 1.5 hours due to this condition). That is, $$\phi_B - \phi_{v1} - \phi_{V2}$$

The above-mentioned ballistic amount $\phi_B$ is the function of the velocity difference and the difference of the velocity error is also the function of the latitude as expressed in the above-mentioned equation. Therefore, strictly speaking, the condition in the above-mentioned equation is established only in particular latitude (referred to as a reference latitude). In other latitudes, the error $\Delta\phi$ of FIG. 6 is generated immediately after the ship turns and then in accordance with the fundamental movement characteristics of the gyro compass, the gyro compass carries out the damping movement toward the velocity error $\phi_{V2}$ provided immediately after the ship turns.

Instead of the above-mentioned damping weight 7, there is proposed a method in which the north-seeking movement of the gyro compass is carried out by, for example, the inclinometer or tilt meter for outputting the inclined angle of the spin axis of the gyro compass relative to the horizontal plane, an amplifier supplied with the output of the tilt meter, a torquer supplied with the output of the amplifer and so on. This method has the advantage such that the damping characteristic of the north-seeking movement can be arbitrarily corrected only by adjusting the gain of the amplifier.

The system utilizing the electrical torquer instead of the mechanical damping weight in order to obtain the above-mentioned damping effect considerably depends on accuracy of apparatus for detecting the above-mentioned reference inclined angle.

However, high efficiency and high accuracy requested for the inclined angle detecting apparatus of the gyro compass for multipurpose except a part of war-use makes the gyro compass expensive.

As a result, in the gyro compass utilizing the inexpensive inclined angle detecting apparatus available on the market, an error occurs in the azimuth transmission angle of the gyro compass due to the error appearing in the inclined angle detecting apparatus.

OBJECTS AND SUMMARY OF THE INVENTION

Accordingly, it is an object of the present invention to provide an improved fast settle apparatus for use with a gyro compass in which the aforementioned shortcomings and disadvantages of the prior art can be eliminated.

More specifically, it is an object of the present invention to provide a fast settle apparatus for use with a gyro compass in which fast settle time can be reduced.

It is another object of the present invention to provide an error correcting apparatus for use with a gyro compass in which gyro compass error can be corrected with ease.

As a first aspect of the present invention, a gyro compass having a gyro case housing therein a gyro whose spin axis is held substantially in the horizontal plane, a supporting device for supporting the gyro case with freedom of three axes, a function for outputting a signal corresponding to an inclined angle of the gyro spin axis relative to the horizontal plane and a function for applying a torque around a vertical axis of the gyro case in proportion to an input signal is comprised of a control apparatus supplied with the signal corresponding to the inclined angle and a latitude value at which the gyro compass is located, wherein a constant (or a damping constant) relative to the input latitude value is set by the control apparatus after the gyro compass is energized, a signal, which results from differentiating the signal corresponding to the inclined angle during a predetermined time, is added to a signal, which results from multiplying the signal corresponding to the inclined angle with the constant and an added result is set as the input signal, whereby a constant optimum north-seeking movement is carried out regardless of the change of the latitude value to thereby reduce a settle time.

In accordance with a second aspect of tho present invention, a gyro compass having a gyro case housing therein a gyro whose spin axis is held substantially in the horizontal plane, a supporting device for supporting the gyro case with freedom of three axes, a function for outputting a signal corresponding to an inclined angle of the gyro spin axis relative to the horizontal plane, a function for applying a torque around a vertical axis of the gyro case in proportion to an input signal and an azimuth transmitter for transmitting an azimuth of the spin axis relative to a navigation vehicle is comprised of an error correcting apparatus supplied with the signal corresponding to the inclined angle, a speed signal of the navigation vehicle and a ship's heading azimuth signal thereof, wherein a bias error caused by the inclined angle of the gyro compass spin axis relative to the horizontal plane and an azimuth error caused by the movement of the navigation vehicle are estimated and calculated to thereby reduce an azimuth error caused by the bias error.

The above and other objects, features, and advantages of the present invention will become apparent from the following detailed description of illustrative embodiments thereof to be read in conjuction with the accompanying drawings, in which like reference numerals are used to identify the same or similar parts in the several views.

DETAILED DESCRIPTION OF THE PREFERRED EMBODIMENTS

Figure 1:
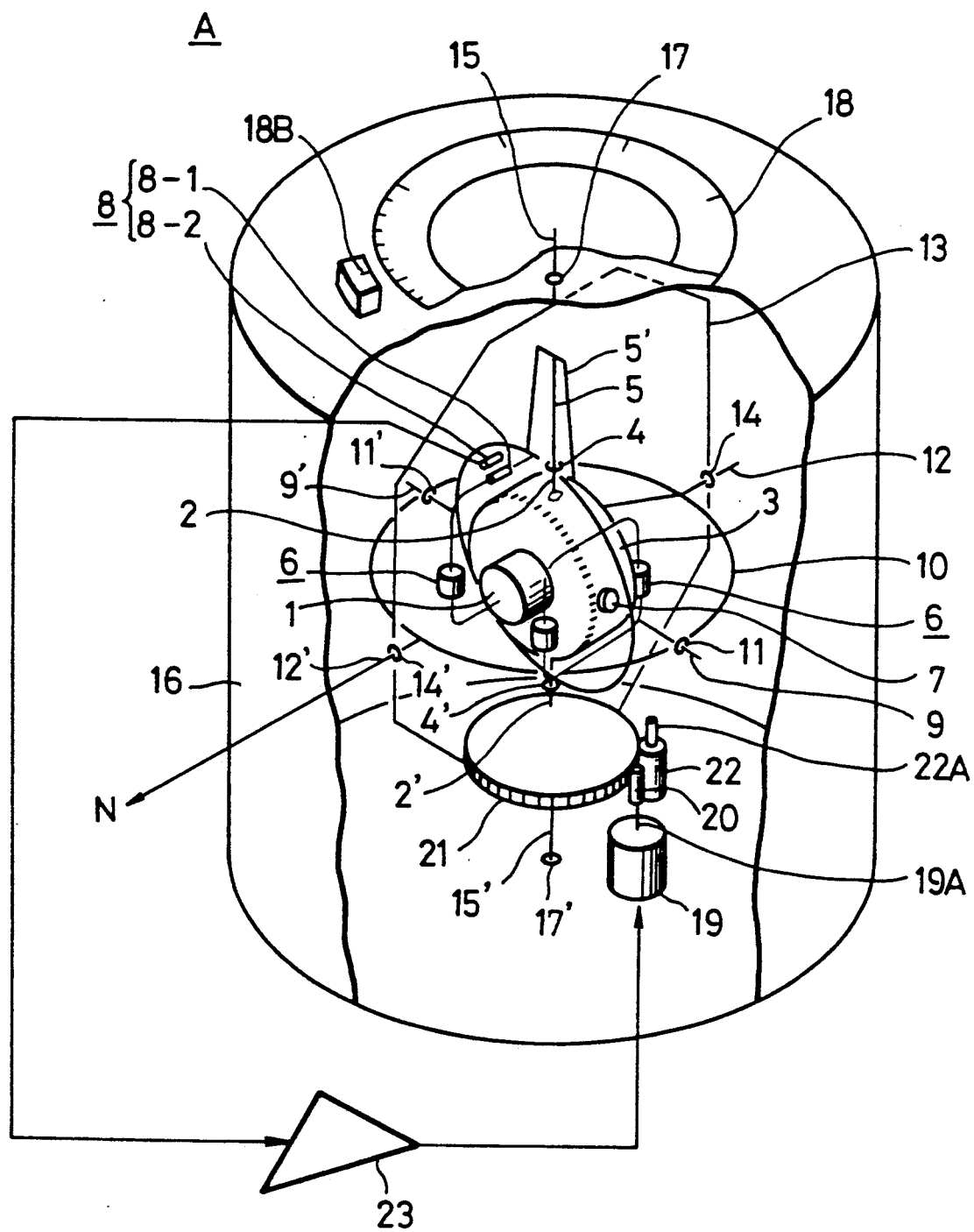
FIG. 1 shows an example of a conventional gyro compass in a perspective view fashion and to which the present invention is applied.
Figure 2:
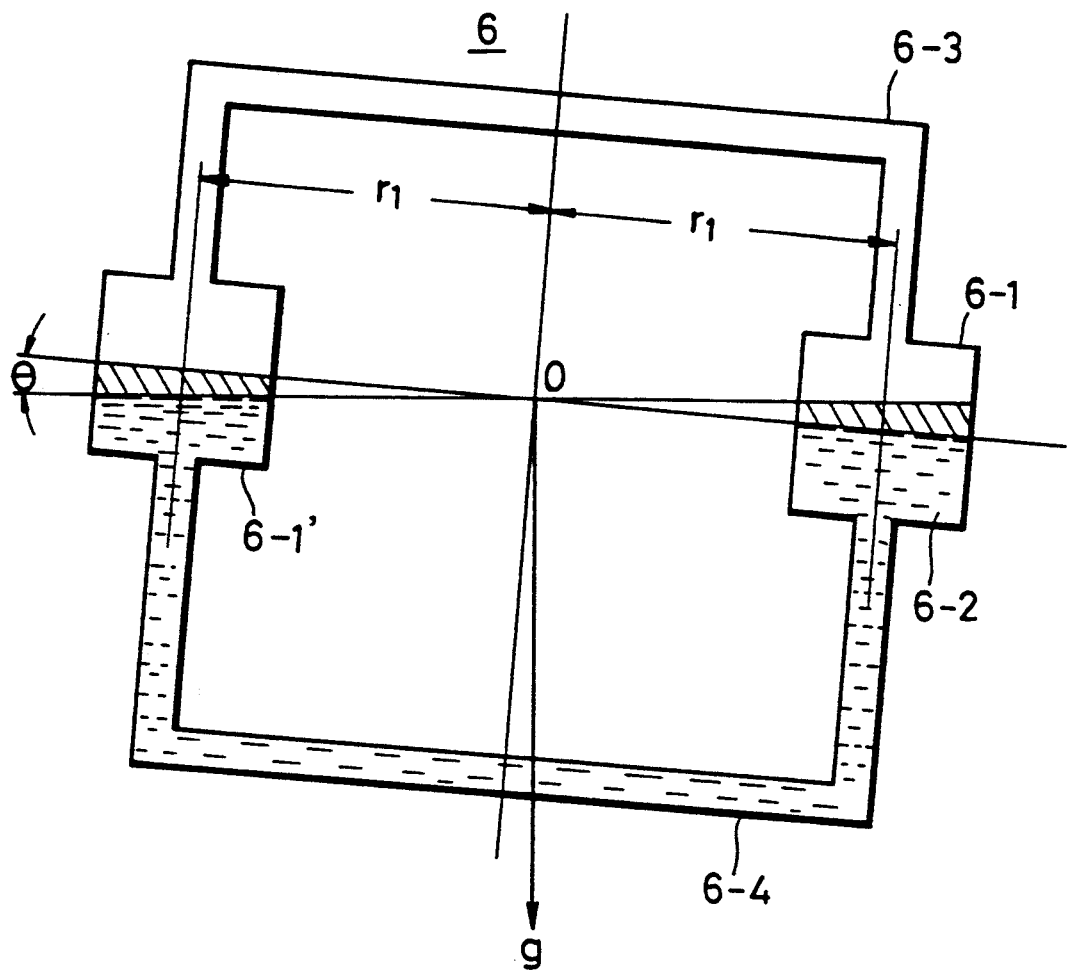
FIG. 2 shows a schematic diagram of a liquid ballistic used in the conventional gyro compass of FIG. 1.
Figure 3:
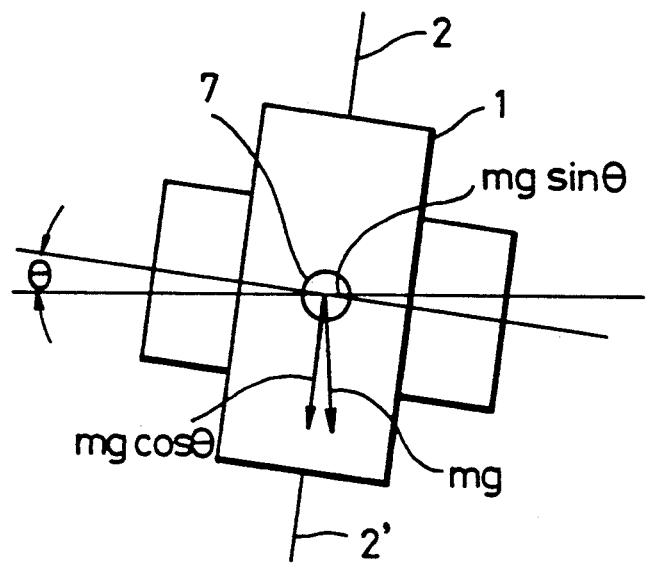
FIG. 3 is a schematic diagram used to explain a principle of the damping weight used in the prior-art gyro compass shown in FIG. 1.

A first embodiment of a fast settle apparatus for use with the gyro compass A according to the present invention will now be described with reference to FIG. 7. In this embodiment, the fast settle apparatus also is applied to the foregoing gyro compass shown in FIG. 1. Accordingly, in FIG. 7, like parts corresponding to those of FIG. 1 are marked with the same references and therefore need no be described in detail.

Figure 7:
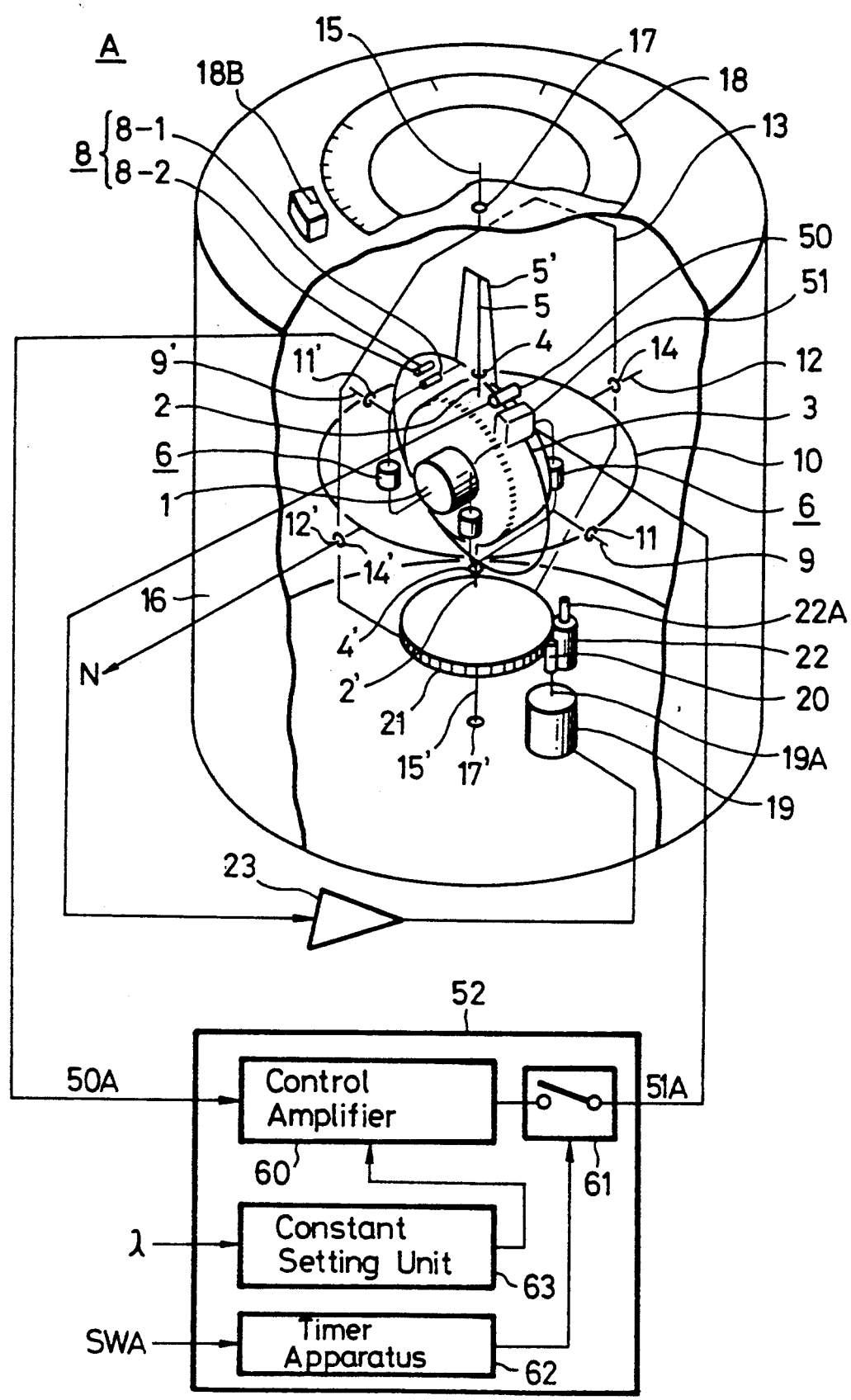
FIG. 7 shows a perspective view of a gyro compass to which a fast settle apparatus of a first embodiment according to the present invention is applied.

The first embodiment of the present invention shown in FIG. 7 is different from the aforementioned example of the prior art shown in FIG. 1 only in the following points:

In the first embodiment of the present invention shown in FIG. 7, the vertical ring 3 has mounted thereon a tilt meter 50, the input axis of which is in parallel with the spin axis of the gyro rotor;

the vertical ring 3 and the gyro case 1 have mounted therebetween a vertical torquer which applies a torque proportional to an input current to the vertical shafts 2, 2' of the gyro case 1; and a control apparatus 52 is provided to receive an output signal 50A (proportional to an inclined angle of the gyro spin axis relative to the horizon) and a latitude value set by the external unit and to supply an output signal 51A to the vertical torquer 51, thereby removing the damping weight 7.

Referring to FIG. 7, it will be seen that the control apparatus 52 is comprised of a timer apparatus 62, a switch 61 controlled by the timer apparatus 62, a control amplifier 60 for generating a damping signal for effecting the fast settle, and a constant setting unit 63 for setting a damping constant. The switch 61 is turned on and off by the mode change-over signal from the timer apparatus 62 so that the output signal 51A is controlled. The timer apparatus 62 is energized by a switch-on signal SWA of the gyro compass or by a signal equivalent to the switch-on signal SWA and generates a signal for turning off the switch 61 after a predetermined fast-settle time is passed. A period during the timer apparatus 62 is operated is called a fast-settle mode (a period after this fast-settle mode is called a navigation mode).

A control apparatus 52 of the present invention will be described with reference to FIG. 8.

In the control apparatus 52, during the fast settle mode, a constant relative to the initial input latitude value λ is set by the constant setting device 63. This constant is equivalent to a constant of the conventional damping weight and will hereinafter be determined as a damping constant μ'. By the action of the damping constant λ', a mechanical damping action of the north-damping seeking movement done by the conventional damping weight is effected electrically. The damping constant μ' thus determined is set to μ' in the control amplifier 60.

In the above-mentioned constant setting device 63, the damping constant μ' relative to the latitude value λ is expressed by the following equation:

$$\mu' = \mu \left( \frac{\cos \lambda}{\cos \lambda_o} \right)^{\frac{1}{2}}$$

where $\mu_o$ and $\cos \lambda_o$ represent constants by which the north-seeking movement is optimized.

From the above-mentioned equation, the damping constant λ' relative to the latitude value λ is proportional to $(\cos \lambda)^{\frac{1}{2}}$.

The control amplifier 60 will be described next. The output signal 50A of the tilt meter 50 is input through the control amplifier 60 to the vertical torquer 51 as the control signal 51A. An example of the transfer function of the control amplifier 60 is expressed by the following equation:

$$G(s) = \frac{-\eta S + \mu'}{\tau_f S + 1}$$

where $\tau_f$ is the time constant of a swinging filter, $\eta$ the differentiation time and S the Laplace operator, respectively.

In this example, the control amplifier 60 has a differentiation function and a multiplication (or proportion) function, and positively feeds the torque proportional to the differentiated time of the inclined angle of the gyro spin axis (i.e., the output signal 50A of the tilt meter 50) back to the vertical torquer 51 by the former function thereof. More specifically, when the gyro spin axis (e.g., the north-seeking end) is moved upwards, then its ascending speed is increased more. Conversely, when the gyro spin axis is moved downwards, then its descending speed is increased, thereby the cycle of the north-seeking movement being reduced. Further, the control amplifier 60 performs, by the latter function thereof, the electrical damping action instead of the mechanical damping action done by the conventional damping weight so that the optimum constant north-seeking movement is carried out for the change of the latitude, thus making it possible to reduce the settle time considerably.

Figure 8:
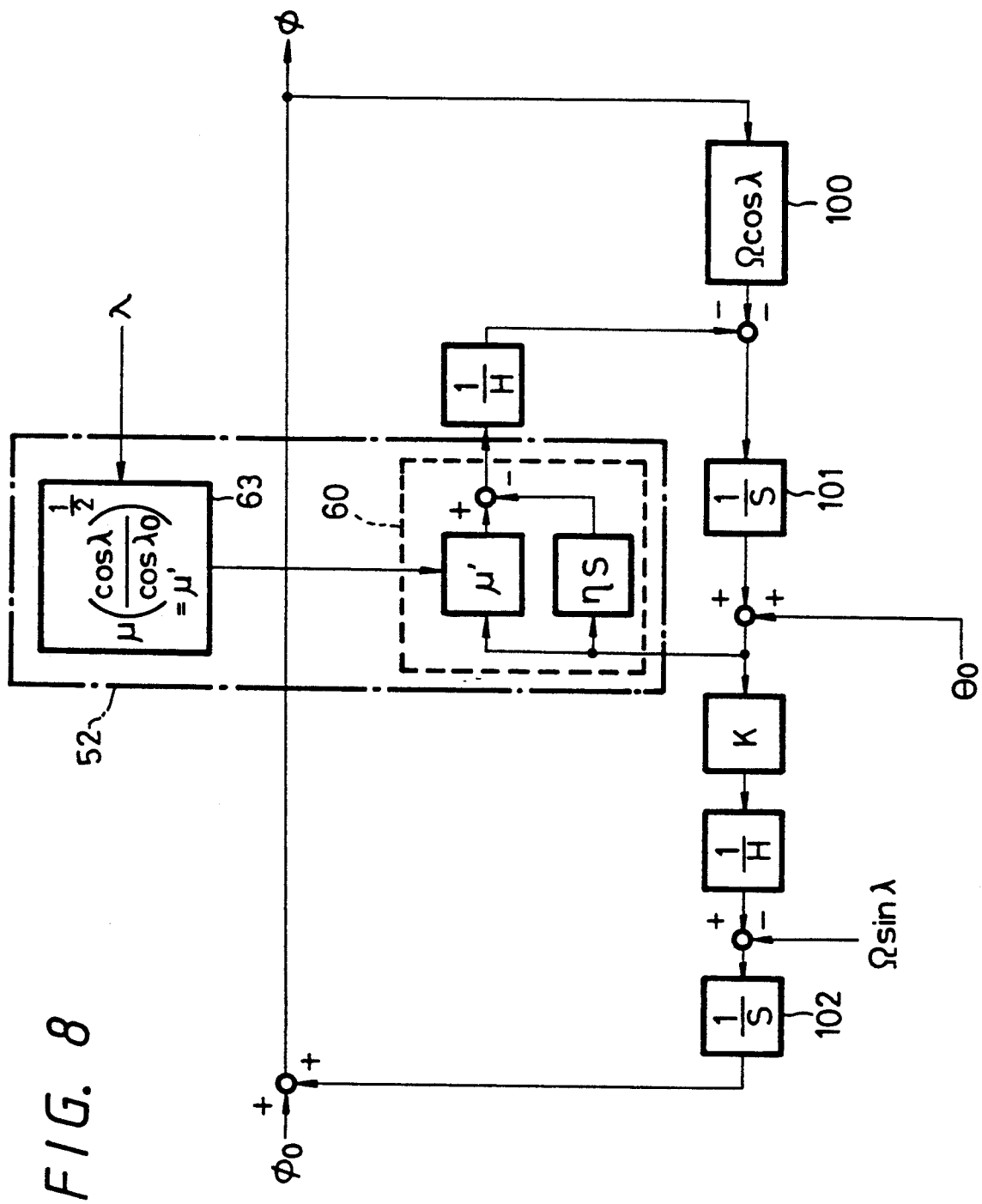
FIG. 8 shows a schematic block diagram used to explain a principle of the present invention.

The embodiment of the present invention shown in FIG. 8 is different from the example of the prior art shown in FIG. 4 as follows.

Figure 4:
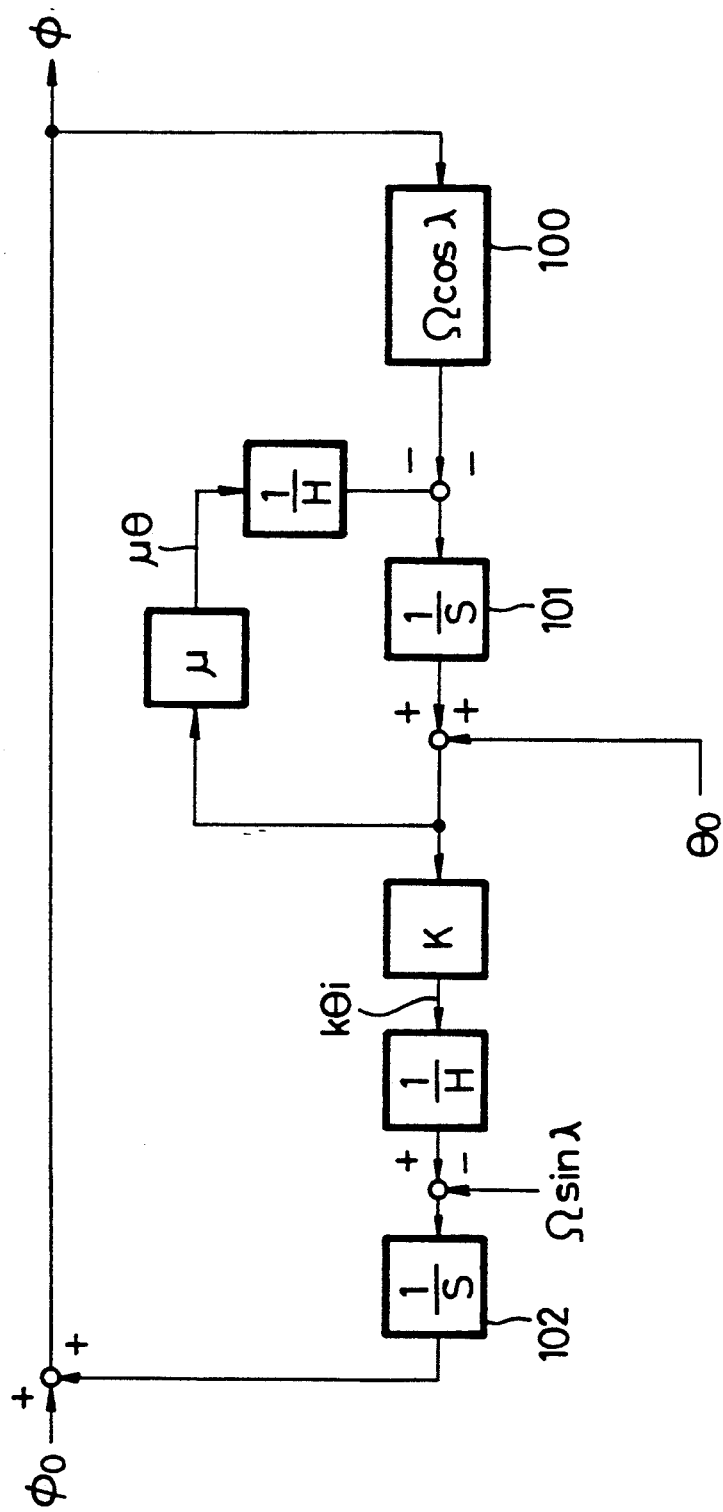
FIG. 4 is a schematic block diagram used to explain a principle of the conventional gyro compass shown in FIG. 1.

That is, the constant setting device 63 for setting the optimum damping constant μ' relative to the latitude value λ, the differentiation and the damping constant μ' are added to the example of FIG. 4 as shown by a one-dot chain line in FIG. 8. In FIG. 8, for simplicity, the transmission function of the control amplifier 60 is represented by the differentiation element S and the damping constant μ', and the gain from the tilt meter 50 for detecting the inclined angle θ of the gyro to the vertical torquer 51 is represented by θS-μ'.

Calculating the characteristic equation which expresses the movement of the azimuthal error φ of FIG. 8, we have:

$$(H-\eta)\ddot{\phi} + \mu'\dot{\phi} + K\omega\cos\lambda\cdot\phi = 0$$

As a consequence, by the addition of the fast-settle mode shown by η, the fast-settle mode η acts to reduce the angular momentum H of the gyro. From the above equation, the north-seeking movement proper cycle Tn of the gyro is expressed as:

$$Tn = 2\pi / \sqrt{\frac{K\Omega\cos\lambda}{(H-\eta)}}$$

Also, a half-period attenuation factor F which expresses the damping degree is expressed as:

$$F = e^{-\frac{\mu'}{4(H-\eta)}} T_n$$

$$= e^{-\frac{1}{4\sqrt{(H-\eta)K\Omega}}} \cdot \frac{\mu'}{\sqrt{\cos \lambda}}$$

$$= e^{-\frac{1}{4\sqrt{(H-\eta)K\Omega}}} \cdot \mu \sqrt{\cos \lambda}$$

It is clear from the above-mentioned equation that the half-period attenuation factor F is constant relative to the latitude at which the gyro compass is disposed. That is, the half-period attenuation factor F is constant relative to any latitude values.

More specifically, in the fast-settle mode, the gyro cycle Tn can be reduced by the application of torque $\eta\theta$ around the vertical axis of the gyro and the following equation is established.

$$\mu' = \mu_o \left( \frac{\cos \lambda}{\cos \mu_o} \right)^{\frac{1}{2}}$$

If $\mu_o$ represents a proper damping constant, then it is to be understood that the value of the half-period damping factor F can always be made constant relative to the latitude value $\lambda$. Therefore, if $\mu_o$ is selected so as to effect the optimum north-seeking operation, then the optimum half-period attenuation factor F can be obtained, which can as a result considerably reduce the settle time of the conventional gyro compass.

Incidentally, as clear from the above-mentioned equation, in order to maintain the north-seeking movement stable, the following inequality must be established:

$$\eta < H$$

Further, by adding the slew mode in which the follow-up ring 13 is rotated to become coincident with the correct ship's heading by applying a voltage to the azimuth servo motor 19 before the gyro rotor is energized, it is possible to reduce the settle time more.

While the present invention is applied to the gyro compass which includes neither the tilt meter nor vertical torquer shown in FIG. 1 as described above, the present invention is not limited thereto and may be applied to a gyro compass having, for example, a tilt meter function, that is, the function in which a signal corresponding to an inclined angle of the spin axis relative to the horizon and a torque to the input signal is applied around the vertical axis of the gyro and the function in which a damping gain can be corrected by the latitude value. In this case, if the gyro compass has the above-mentioned functions, then such functions are utilized, that is, without newly providing the tilt meter and the vertical torquer, the control apparatus of the present invention is additionally provided, and then it is possible to obtain the gyro compass in which the optimum north-seeking movement is effected regardless of the change of the latitude value to thereby reduce the settle time.

According to the present invention, by adding the fast-settle apparatus of the above configuration, it is possible to obtain the gyro compass of simplified arrangement which can be made inexpensive and whose settle time is short regardless of the change of the latitude. Although the settle time is increased with the increase of the latitude value in the prior art, according to the present invention, the settle time can be prevented from being increased with the increase of the latitude value so that the settle time can be reduced really. At that time, if the signal corresponding to the time differentiation of the gyro spin axis is applied as the torque around the vertical axis, then the short settle time can be achieved by the simple calculation. Further, as compared with the conventional method in which the north-seeking torque (around the horizontal axis) is increased, according to the present invention (the torque around the vertical axis according to the system of the present invention), the torque necessary for the fast settle operation may be small so that the torquer may be small in size or that the amplifier of small power consumption may be utilized.

While the electric type damping system is described in the above-mentioned embodiment, the conventional mechanical type damping system can also be applied to the present invention, in which case, a difference of the mechanical damping system relative to the optimum damping gain may be corrected by the torquer.

An example of an error correcting apparatus which can be applied to the gyro compass of the present invention will be described below with reference to FIGS. 9 and 10.

Figure 9:
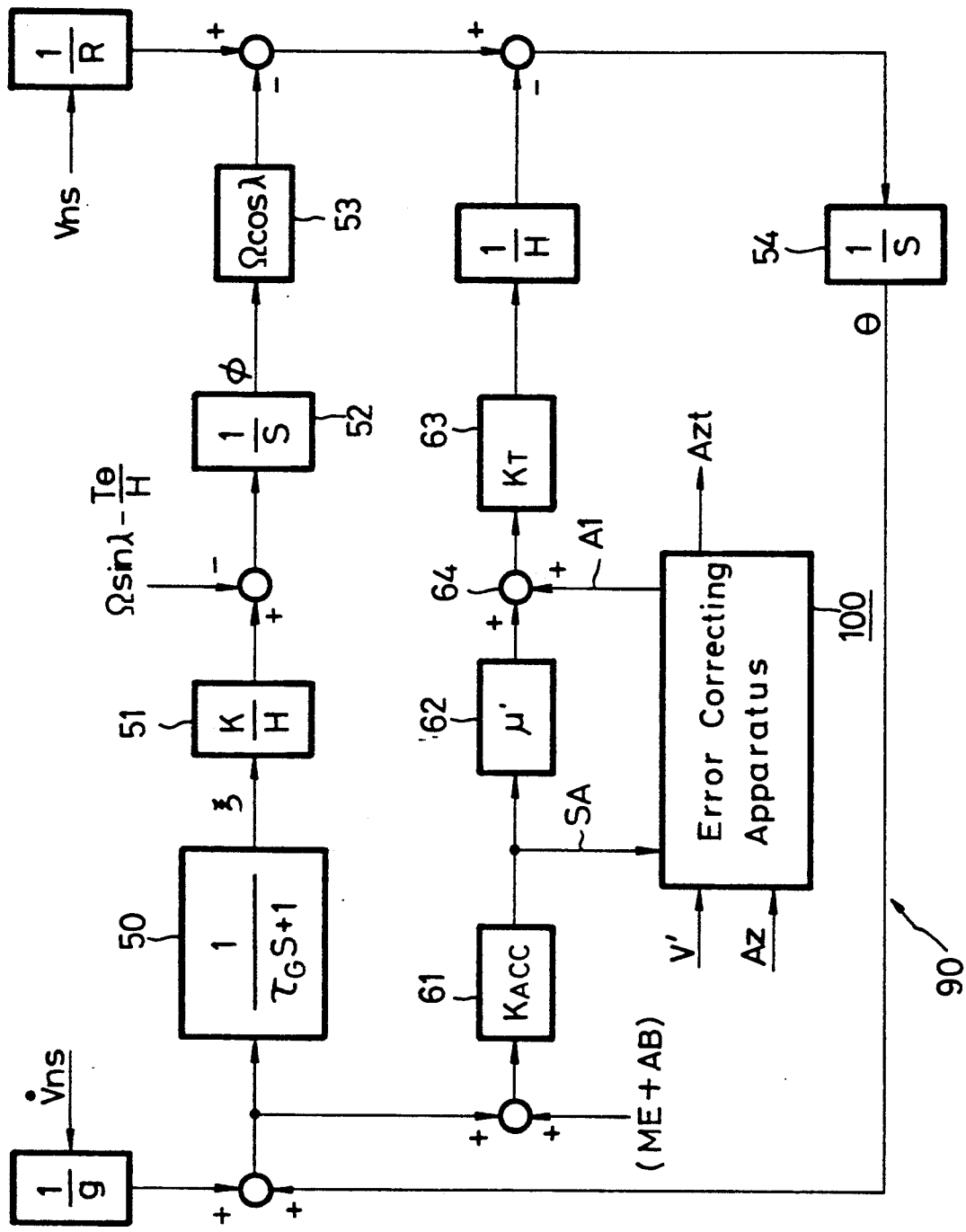
FIG. 9 shows in block form a gyro compass to which an error correcting apparatus according to the present invention is applied.

In FIG. 9, reference symbol A generally designates an example of the gyro compass to which the present invention can be applied. This gyro compass A is substantially the same as that described earlier with reference to FIGS. 1 to 5. Accordingly, in FIG. 9, like parts corresponding to those of FIGS. 1 to 5 are marked with the same references and therefore need not be described.

FIG. 9 shows in block form the gyro compass A which is comprised of an error correcting apparatus 100, a tilt meter 61 instead of the mechanical damping weight having a gain $K_{ACC}$ provided as an apparatus for outputting an inclined angle of the gyro spin axis relative to the horizon instead of the mechanical damping weight, an amplifier 62 having a gain $\mu'$ which is supplied with the output of the tilt meter 61 and a torquer 63 having a gain $K_T$ around the vertical axis which is supplied with the output of the amplifier 62.

Figure 5:
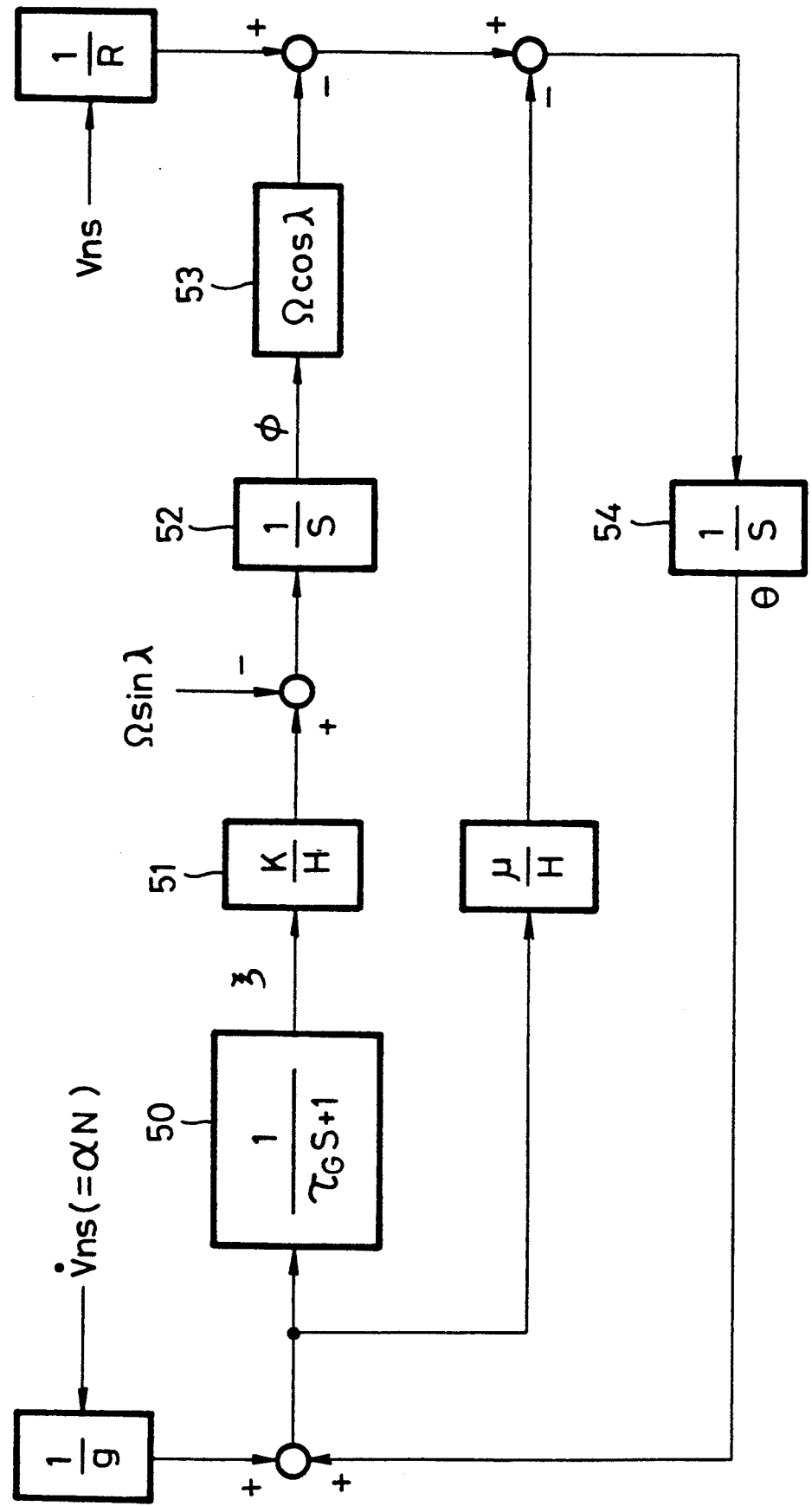
FIG. 5 shows a functional block diagram of the gyro compass shown in FIG. 1.
Figure 6:
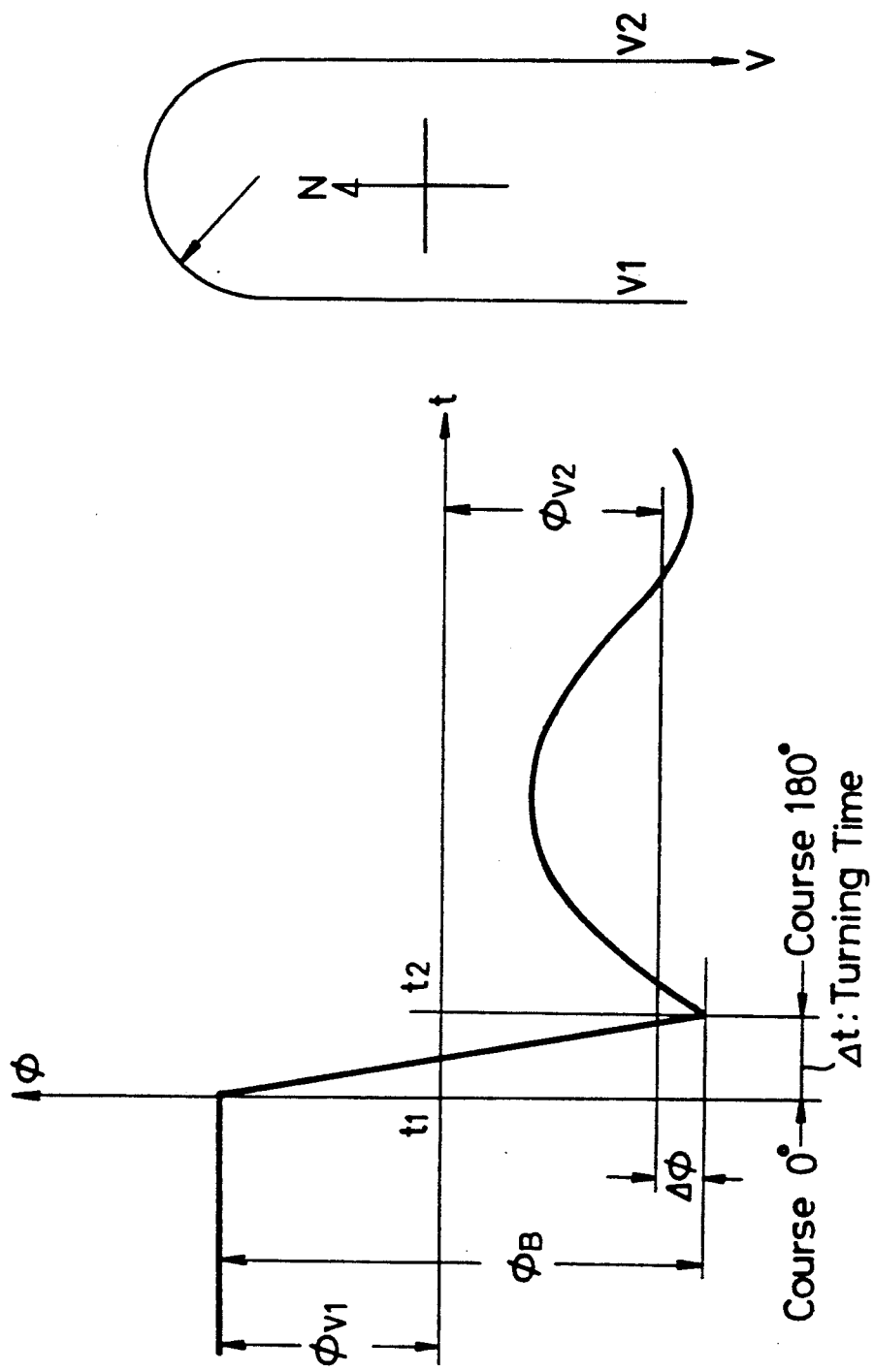
FIG. 6 is a graph to which references will be made in explaining a gyro compass error caused when a navigation vehicle is moved.

A relation between the damping constant $\mu$ and the gain $\mu'$ of FIG. 5 is expressed by the following equation (1)

$$\mu = K_{ACC} \mu' \cdot K_T \qquad (1)$$

The gyro compass A to which the gyro compass error correcting apparatus 100 of the present invention is applied will be described below.

For simplicity, the azimuthal error $\phi$ produced at the timing point after sufficient settle time is expressed by the following equation from FIG. 1:

$$\phi_{t=\infty} = -\frac{1}{\Omega \cos \lambda} \cdot \frac{\mu}{K} \cdot \qquad (2)$$

$$\left\{ \frac{K}{H}(ME + AB) + \Omega \sin \lambda - \frac{T_o}{H} \right\} + \frac{1}{\Omega \cos \lambda} \cdot \frac{V_{NS}}{R}$$

where $\mu$ is the damping constant which can be described by the relation of the equation (1), $\omega$ the rotational angular velocity of the earth, $\lambda$ the latitude of the position at which the gyro compass is located, K the north-seeking gain, ME the error angle at which an inclined angle detecting apparatus is attached to the horizon of the spin axis, AB the term expressed by the sum of drift items changed by a fixed bias proper to the inclined angle detecting apparatus, a temperature or the like, $T_\theta$ the mechanical umbalance torque amount around the horizontal axis, $V_{NS}$ the velocity of navigation vehicle in the north-to-south axis direction with its north direction as +, and R the radius of the earth.

Accordingly, the azimuthal error $\phi$ is expressed by errors generated around four axes parallel to the spin axis.

As described above, due to the fixed bias of the tilt meter 61 which is the inclined angle detecting apparatus for the gyro spin axis, the term AB expressed by the sum of drifts changed with the temperature or the like and the north-south axis velocity of the navigation vehicle, the azimuthal error of the gyro compass A takes place.

As shown in FIG. 9, the error correcting apparatus 100 of the present invention is supplied with the inclined angle signal from the gyro compass, that is, a detected inclined signal SA derived from the tilt meter 61, an azimuth signal $A_z$, a velocity signal V' of the navigation vehicle having the gyro compass or the like. The error correcting apparatus 100 derives a correcting signal A1 for correcting a bias error caused by the inclined angle signal of the gyro compass and an actual azimuth signal Azt from which an error caused by the movement of the navigation vehicle is removed.

Figure 10A:
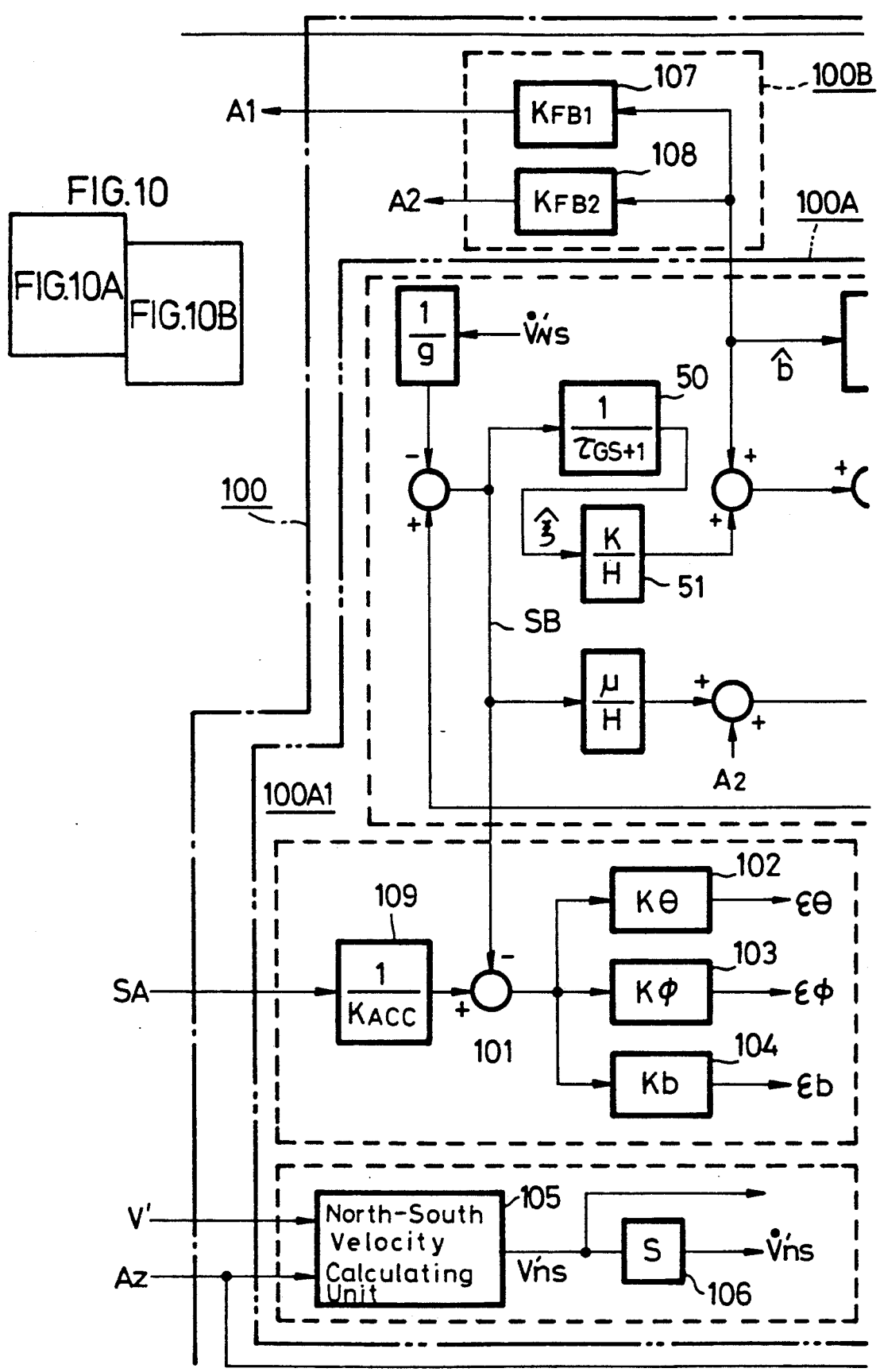
FIG. 10, which is formed of FIGS. 10A and 10B drawn on two sheets of drawings so as to permit the use of a suitably large scale, is a block diagram showing an embodiment of the error correcting apparatus of the present invention.
Figure 10B:
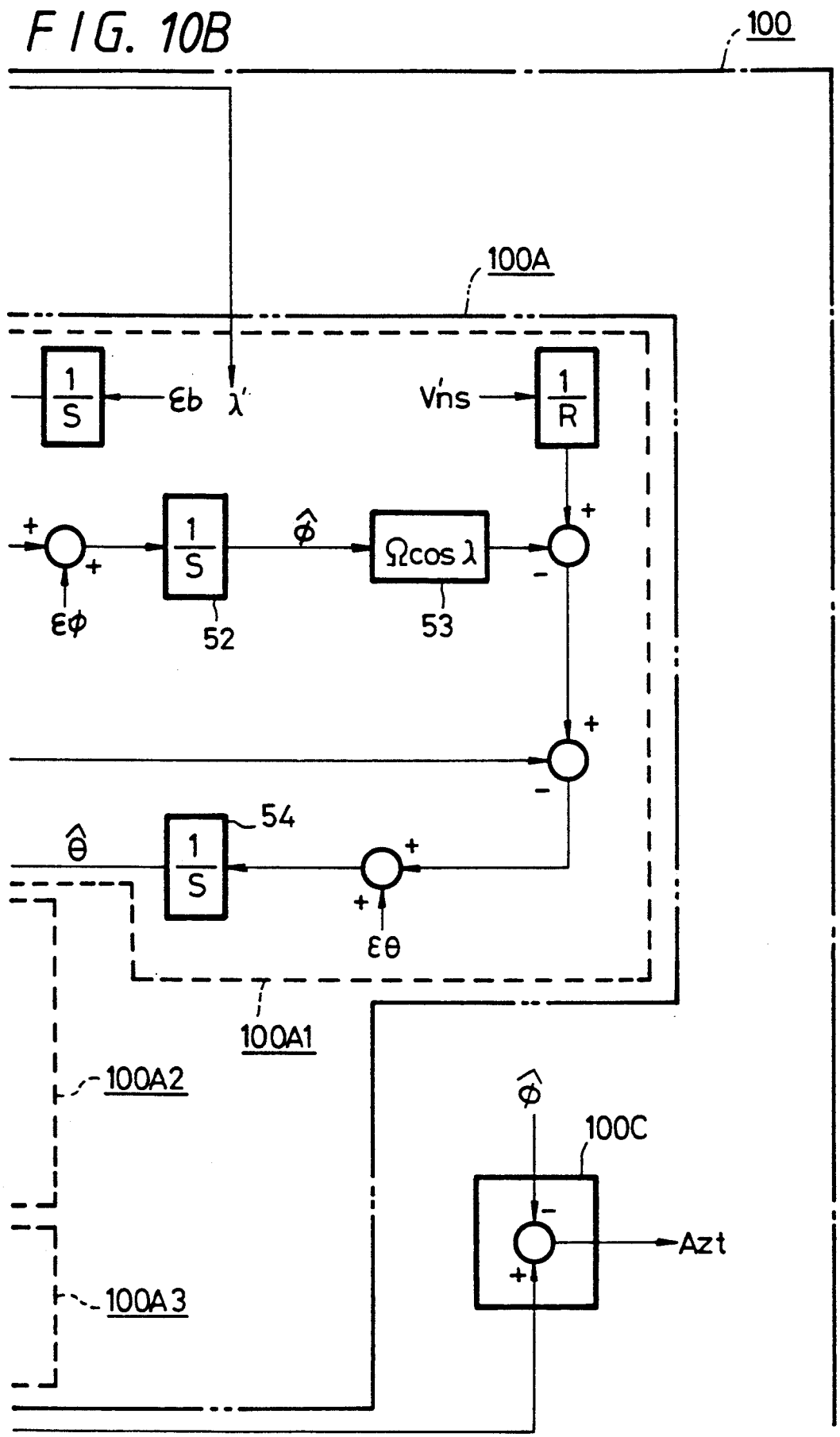

FIG. 10 shows more in detail the arrangement of the error correcting apparatus 100. In this case, FIG. 10 is formed of FIGS. 10A and 10B drawn on two sheets of drawings so as to permit the use of a suitably large scale.

Referring to FIG. 10, the error correcting apparatus 100 is composed of an error calculating unit 100A, a bias error correcting unit 100B and an azimuth error correcting unit 100C. The error calculating unit 100A further includes a model calculating unit 100A1, an error detecting unit 100A2 for the model calculating unit 100A1 and an external information processing unit 100A3.

The above-mentioned respective units will be described with reference to FIG. 10. The model calculating unit 100A1 of the error calculating unit 100A is designed so as to have the same characteristic as that of the gyro compass shown in FIG. 9 and therefore both of them include substantially the same elements 50 to 54A.

In the error detecting unit 100A2 for the model calculating unit 100A1 in the error calculating unit 100A, it is determined by comparing the gyro compass detection inclined signal SA with the equivalent inclined signal SB from the model calculating unit 100A1 by a comparator 101 whether or not the model calculating unit 100A1 is coincident with the gyro compass. If they are not coincident with each other, a difference therebetween is multiplied with gains $K\theta$, $K\phi$ and Kb by coefficient generators 102, 103 and 104 to thereby supply first, second and third correcting amounts $\epsilon\theta$, $\epsilon\phi$ and $\epsilon b$ to the model calculating unit 100A1, in which values $\hat{\theta}$, $\hat{\phi}$ and $\hat{b}$ of the model calculating unit 100A1 are corrected one more time.

In the external information processing unit 100A3 of the error calculating unit 100A, values V'ns and V'ns necessary for presenting the same situation as the situation in which the gyro compass is affected by the movement of the navigation vehicle are calculated by the north-south velocity calculating unit 105 and the differentiator 106.

Accordingly, the above-mentioned error calculating unit 100A includes the error detecting unit 100A2 for the model calculating unit 100A1 which acts as a negative feedback loop in such a fashion that the equivalent inclined signal SB from the model calculating unit 100A1 becomes coincident with the detection inclined signal SA from the gyro compass.

The gains $K\theta$, $K\phi$ and Kb in the error detecting unit 100A2 for the model calculating unit 100A1 need not be described herein because they are obtained by Kalman filter theory or observer theory in the control engineering or by the method of least square in the statistics and so on.

The bias error correcting unit 100B receives an equivalent bias estimator, which will be described later, from the abovementioned error calculating unit 100A and feed the correcting signals A1, A2 through the coefficient generators 107, 108 having correcting gains $K_{FB1}$, $K_{FB2}$ back to the gyro compass and the model calculating unit 100A1, thereby correcting the azimuthal error caused by the equivalent bias amount.

The above-mentioned correcting gains are expressed by the following equations:

$$K_{FB1} = -\frac{\mu}{K} \cdot \frac{1}{K_T} \quad (3)$$

$$K_{FB2} = -\frac{\mu}{K}$$

The azimuth error correcting unit 100C generates a true azimuth signal Azt by such a manner that an azimuth error estimated amount, which will be described later, is derived from the above-mentioned error calculating unit 100A and then subtracted from the azimuth signal Az to thereby remove the azimuthal error involved in the azimuth signal Az.

Specific operation of the error calculating unit 100A will be described below.

Initially, the detection inclined signal SA from the gyro compass is divided by $K_{ACC}$ by the coefficient generator 109 of the error detecting unit 100A2 for the model calculating unit 100A1 because the unit system must be made coincident with the equivalent inclined signal SB from the model calculating unit 100A1. The signal thus divided and the equivalent inclined signal SB from the model calculating unit 100A1 are input through the comparator 101 in the error detecting unit 100A2 for the model calculating unit 100A1 to the coefficient generators 102, 103, 104 having the gains $K\theta$, $K\phi$ and Kb.

In the error detecting unit 100A2 for the model calculating unit 100A1, the value, which results from subtracting the equivalent inclined signal SB from the model calculating unit 100A1 from the gyro compass detection inclined signal SA, is multiplied with the gains $K\theta$, $K\phi$ and Kb to thereby generate values $\epsilon\theta$, $\epsilon\phi$ and $\epsilon b$, respectively.

In the model calculating unit 100A1, the value $\epsilon\phi$ is the correcting amount of the estimated value of $\hat{\theta}$ of the inclined signal in the model calculating unit 100A1, $\epsilon\phi$ the correcting amount of the estimated value $\hat{\phi}$ of the azimuthal error and $\epsilon b$ the correcting amount of the estimated value $\hat{b}$ of the equivalent bias, respectively.

By these correcting amounts $\epsilon\theta$, $\epsilon\phi$ and $\epsilon b$, the respective estimated amounts of the model calculating unit 100A1 are corrected and the gyro compass detection inclined signal SA and the equivalent inclined signal SB estimated amount from the model calculating unit 100A1 are again compared with each other by the error detecting unit 100A2 for the model calculating unit 100A1. This comparison is continued until the inclined signal estimated value becomes coincident with the inclined signal. At that time, in order to supply the model calculating unit 100A1 with the influence substantially equal to those of the north-south axis direction velocity Vns and the north-south axis acceleration $\dot{V}$'ns acting on the gyro compass when the navigation vehicle is moved, the signals $\dot{V}$'ns and V'ns from the external information processing unit 100A3 which is supplied with the velocity signal V' and the azimuth signal Az are caused to act on the model calculating unit 100A1.

As a consequence, in the error calculating unit 100A, the inclined signal estimated value $\hat{\theta}$ becomes coincident with the inclined signal $\theta$ of the gyro compass.

Therefore, the inclined signal error estimated value $\hat{\phi}$ within the model calculating unit 100A1 coincides with the azimuth error of the gyro compass and the estimated value of the bias value becomes equal to the bias value which generates the inclined signal $\theta$ of the gyro compass.

By the provision of the error correcting apparatus to receive the detection inclined signal SA of the gyro compass and to output the correcting signal A1 to the torquer around the vertical axis in which the inclined angle of the spin axis of the gyro compass relative to the horizontal plane is calculated as the equivalent bias value $\hat{b}$, the error of the tilt meter caused by the fixed bias component included in the apparatus such as a tilt meter and by the drift component changing with the change of temperature or the like, the mount error of the inclination detecting apparatus relative to the horizontal plane of the gyro compass spin axis, the horizontal axis torque error caused by the mechanical unbalance state around the gyro compass spin axis (or north-south axis), the latitude error caused by the earth rotation component input to the gyro compass with the change of the latitude and so on are treated as the bias component acting on the gyro compass, this component can be calculated and corrected with ease.

Therefore, according to the error correcting apparatus of the present invention, this equivalent bias value $\hat{b}$ is calculated and the torquer of the gyro compass is corrected, thus making it possible to eliminate the azimuthal error caused by the inclined angle $\theta$.

Further, by adding the error correcting apparatus of the present invention to the gyro compass without changing the conventional characteristics, it is possible to reduce the error considerably.

Furthermore, according to the error correcting apparatus of the present invention, in the damping operation done by the inclined angle $\theta$ of the gyro compass, the signal effects to separate the north-seeking movement of the gyro compass and the signal for causing the azimuthal error from each other and only the signal for causing the azimuthal error is removed to thereby extract the azimuthal error caused by the bias component. Also, the error caused by the acceleration accompanying with the movement of the navigation vehicle can be removed from the azimuth signal. In addition, $\hat{\phi}$ can be estimated during a short period of time by adjusting the gains K$\theta$, K$\phi$ and Kb in the error detecting unit of the model calculating unit 100A1. Thus, the error correcting apparatus of the present invention can be utilized as the fast-settle apparatus.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A gyro compass comprising a casing supported for movement freely in three axes; a gyro located in said casing having its spin axis arranged to normally lie in a substantially horizontal axis; means for producing a signal corresponding to the angle of inclination of the spin axis; means for applying a torque around the vertical one of said axis to modify the movement of said casing and control apparatus comprising an input for receiving the signal indicative of the angle of inclination of said spin axis, an input for receiving a signal indicative of the latitude at which said compass is located, means for generating a constant relative to said latitude after said compass is energized, means for differentiating the signal indicative of the angle of inclination of said spin axis during a predetermined time and producing a signal corresponding thereto, means for mutliplying said signal corresponding to the angle of inclination of said spin axis with said constant and corresponding a signal corresponding thereto, means for adding said differentiation signal and said multiplication signal and producing an addition signal, means for applying said addition signal to said means for modifying the movement of said casing whereby a constant optimum north-seeking movement is obtained regardless of any change of latitude so as to reduce the settle time of said compass.

* * * * *

UNITED STATES PATENT AND TRADEMARK OFFICE
CERTIFICATE OF CORRECTION

PATENT NO. : 5,272,815
DATED : December 28, 1993
INVENTOR(S) : Hane et al.

It is certified that error appears in the above-identified patent and that said Letters Patent is hereby corrected as shown below:

Claim 1, Column 16, line 45: change "corresponding" to --producing--.

Signed and Sealed this

Twenty-eighth Day of June, 1994

Attest:

BRUCE LEHMAN

*Attesting Officer*     *Commissioner of Patents and Trademarks*